United States Patent
Swartz et al.

(10) Patent No.: US 9,393,770 B2
(45) Date of Patent: Jul. 19, 2016

(54) METHODS FOR PHOTOSCULPTURE

(71) Applicant: Impossible Objects, LLC, Northbrook, IL (US)

(72) Inventors: Robert Swartz, Highland Park, IL (US); Stephen Ness, San Francisco, CA (US); Eugene Gore, Des Plaines, IL (US); Buckley Crist, Wilmette, IL (US)

(73) Assignee: Impossible Objects, LLC, Northbrook, IL (US)

( * ) Notice: Subject to any disclaimer, the term of this patent is extended or adjusted under 35 U.S.C. 154(b) by 342 days.

(21) Appl. No.: 14/199,603

(22) Filed: Mar. 6, 2014

(65) Prior Publication Data

US 2014/0257549 A1 Sep. 11, 2014

Related U.S. Application Data

(60) Provisional application No. 61/773,810, filed on Mar. 6, 2013.

(51) Int. Cl.

| | | |
|---|---|---|
| *B29C 41/20* | (2006.01) | |
| *B29C 70/68* | (2006.01) | |
| *B32B 3/10* | (2006.01) | |
| *G06T 15/04* | (2011.01) | |
| *G06T 15/08* | (2011.01) | |
| *G06T 17/10* | (2006.01) | |
| *B33Y 10/00* | (2015.01) | |
| *B29C 67/00* | (2006.01) | |
| *B32B 5/02* | (2006.01) | |
| *B33Y 50/00* | (2015.01) | |

(52) U.S. Cl.
CPC .............. *B33Y 10/00* (2014.12); *B29C 67/0074* (2013.01); *B29C 67/0077* (2013.01); *B29C 67/0088* (2013.01); *B32B 5/022* (2013.01); *B32B 5/024* (2013.01); *B33Y 50/00* (2014.12)

(58) Field of Classification Search
CPC B29C 41/20; B29C 67/0051; B29C 67/0074; B29C 67/0077; B29C 70/68; B32B 3/10; B32B 5/022; B32B 5/024; G06T 15/04; G06T 15/08; G06T 17/10
USPC ................. 264/131, 135, 136, 254, 258, 308; 156/58, 308.6; 345/419, 420, 582
See application file for complete search history.

(56) References Cited

U.S. PATENT DOCUMENTS

2004/0070582 A1* 4/2004 Smith ..................... G06T 15/08 345/419

* cited by examiner

*Primary Examiner* — Leo B Tentoni
(74) *Attorney, Agent, or Firm* — Flachsbart & Greenspoon, LLC

(57) ABSTRACT

A 3D object (the "New Object") is fabricated layer by layer by 3D printing. The shape and relative dimensions of the various parts of the New Object match that of another 3D object (the "Target Object"). In addition, the exterior of the New Object appears to be a photographic likeness of the Target Object. The "photographic" likeness is created by variations in visual characteristics of materials in the layers comprising the New Object, and in particular by variations at or near the surface of the New Object. Thus, the photographic likeness is an integral part of these layers comprising the New Object. An object is scanned, from which a texture map is obtained. A CAD model is sliced into slices (bit maps files) which are then colored by a program with the boundary to match the color or gray scale to color the appropriate pixels, derived from the texture map.

16 Claims, 6 Drawing Sheets

METHODS FOR PHOTOSCULPTURE

This application claims the benefit of U.S. Provisional Application No. 61/773,810, filed Mar. 6, 2013. This application (as did the provisional application of which it claims the benefit) hereby incorporates by reference in their entirety the disclosures of the following two applications (the "Prior Applications"): (1) Methods and Apparatus for 3D Fabrication, PCT patent application PCT/US12/52946, international filing date Aug. 29, 2012, and (2) Methods and Apparatus for 3D Printed Composite Materials, U.S. provisional patent application 61/769,724, filed Feb. 26, 2013.

TECHNICAL FIELD OF THE INVENTION

The present invention relates generally to methods and apparatus for 3D printing.

BACKGROUND OF THE INVENTION 3D printing is a well known process used to reproduce a three dimensional object from a target object or digital image. What is needed is a thorough technique to match the photographic likeness of a target object by generating a new object having the same color arrangement and topology of the target object. International Publication No. WO 2013/174526 A1 describes a system configured to assemble a plurality of individual media layers to form a colored 3D object, comprising a printer configured to color print at least a portion of a first surface of each of a plurality of media layers, and color print a corresponding portion of a second surface of the media layer, the second surface being opposite to the first surface, such that on operably printing the second surface a print-through region in the media layer is provided and a collator configured to assemble the plurality of the individual media layers to form the 3D object. It further describes a color 3D object media layer printing module, wherein the module is configured such that a second surface is presented to the printer such that the first and second images are coincident and on operably printing the second surface of the 3D object media layer a print-through region in the 3D object media layer is provided. It further describes an ink for color 3D printing, comprising a wetting agent that reduces the surface tension of the ink, causing it to be absorbed by the printing media. It further describes a medium for color 3D printing, comprising one of cellulose paper, polymer film, metal foils, ceramic powder impregnated paper sheets, metal powder impregnated sheets, polymer powder impregnated sheets, water soluble papers, or substrates made from waxes. And it further describes a layered object manufacturing (LOM) system for rapid prototyping. However, the prior art does not describe a process to fabricate a new 3D object from a target object in which a 3D object is sliced to form a bit map from which a texture map is obtained in order to color the edge of the bit map with color information from the texture map; and further, such that the slices are aligned and fused together and wherein uncoated material is removed by, for example, abrasive blasting, chemical removal or dissolution.

The present invention concerns the reproduction of a target object, accomplished by a step by step process in which a target object is scanned into a 3D file which is sliced and transformed into a bit map. A texture map is obtained from the scan, and the edge of the bit map is colored with color information from the texture map. Liquid is then selectively applied to a substrate, the printed slice is flooded with polymer powder, and excess powder is removed. This is done for each slice. The slices are aligned and fused together, and the uncoated material is removed.

The New Object is colored and painted. Coloring is accomplished by slicing the CAD model into slices. The slices are bit map files. These bit map files are colored by a program with the boundary to match the color, or gray scale to color the appropriate pixels. An area around the boundary should have a slight thickness so that inaccuracies in the process still produce a decorated part. A photograph of the target object is painted on the new object by producing a 3D scan to create a 3D model of the object including a texture map. The texture map is placed on the boundary of the object. Pixels are then extended to enlarge the boundaries to deal with inaccuracies of the process. Then, the 3D scan and texture map are combined.

In a final stage, after each layer is printed then the layer would be flooded with polymer powder, and the sheets fused together in register. Then by chemical or abrasive blasting or combination of the two or other methods the uncoated material would be removed. The boundary would now display the photographic image on the 3D printed object.

In an alternative embodiment of the invention, the new object could be based on a CT scan with colors throughout and those colors could be printed throughout the object. For example, a CT scanner can be used to take a CT scan of the Target Object. An ordinary camera may be used to take photographs of the object so that this information can be applied to the exterior of the CT 3D image. For example, multiple photos may be taken from different angles and then assembled in three dimensions and wrapped around a CT 3D image.

One or more processors or computers may be configured to perform the computations involved in the aforementioned processes.

SUMMARY OF THE INVENTION

The present invention involves fabricating a 3D object (the "New Object") layer by layer by 3D printing. The shape and relative dimensions of the various parts of the New Object match that of another 3D object (the "Target Object"). The exterior of the New Object appears to be a photographic likeness of the Target Object. The "photographic" likeness is created by variations in visual characteristics of materials in the layers comprising the New Object, and in particular by variations at or near the surface of the New Object. Thus, the photographic likeness is an integral part of these layers comprising the New Object. In order to accomplish the object of the invention, a CAD model is sliced into slices. These slices are bit maps files which are then colored by a program with the boundary to match the color or gray scale to color the appropriate pixels.

DETAILED DESCRIPTION OF INVENTION

In exemplary implementations of this invention, a 3D object (the "New Object") is fabricated layer by layer by 3D printing. The shape and relative dimensions of the various parts of the New Object match that of another 3D object (the "Target Object"). In addition, the exterior of the New Object appears to be a photographic likeness of the Target Object.

The "photographic" likeness is created by variations in visual characteristics of materials in the layers comprising the New Object, and in particular by variations at or near the surface of the New Object. Thus, the photographic likeness is an integral part of these layers comprising the New Object.

The visual characteristics of the materials comprising the layers of the New Object vary in different points of the 3D object. For example, the color or shade of the materials may vary within a layer or from layer to layer. When the New Object is fabricated, visual characteristics of materials in the layers (at and near the surface of the New Object) are varied to create the visual effect of a photograph likeness.

Alternately, the shape and relative dimensions of various features of the New Object may differ, at least in part, from that of the Target Object. Also, the photographic likeness may be produced in only a portion of the surface of the New Object.

The New Object can appear to be a "photosculpture" or "3D solid photograph" of the Target Object.

The New Object may be fabricated using methods and apparatus described in the following two applications (the "Prior Applications"): (1) Methods and Apparatus for 3D Fabrication, PCT patent application PCT/US12/52946, international filing date Aug. 29, 2012, and (2) Methods and Apparatus for 3D Printed Composite Materials, U.S. provisional patent application 61/769,724, filed Feb. 26, 2013.

For example, the layers of the New Object may comprise composite material(s), such as a composite material that includes polyester non-woven substrate. Also, for example, the New Object may be fabricated by selectively depositing thermoplastic powder.

Figure 1A:
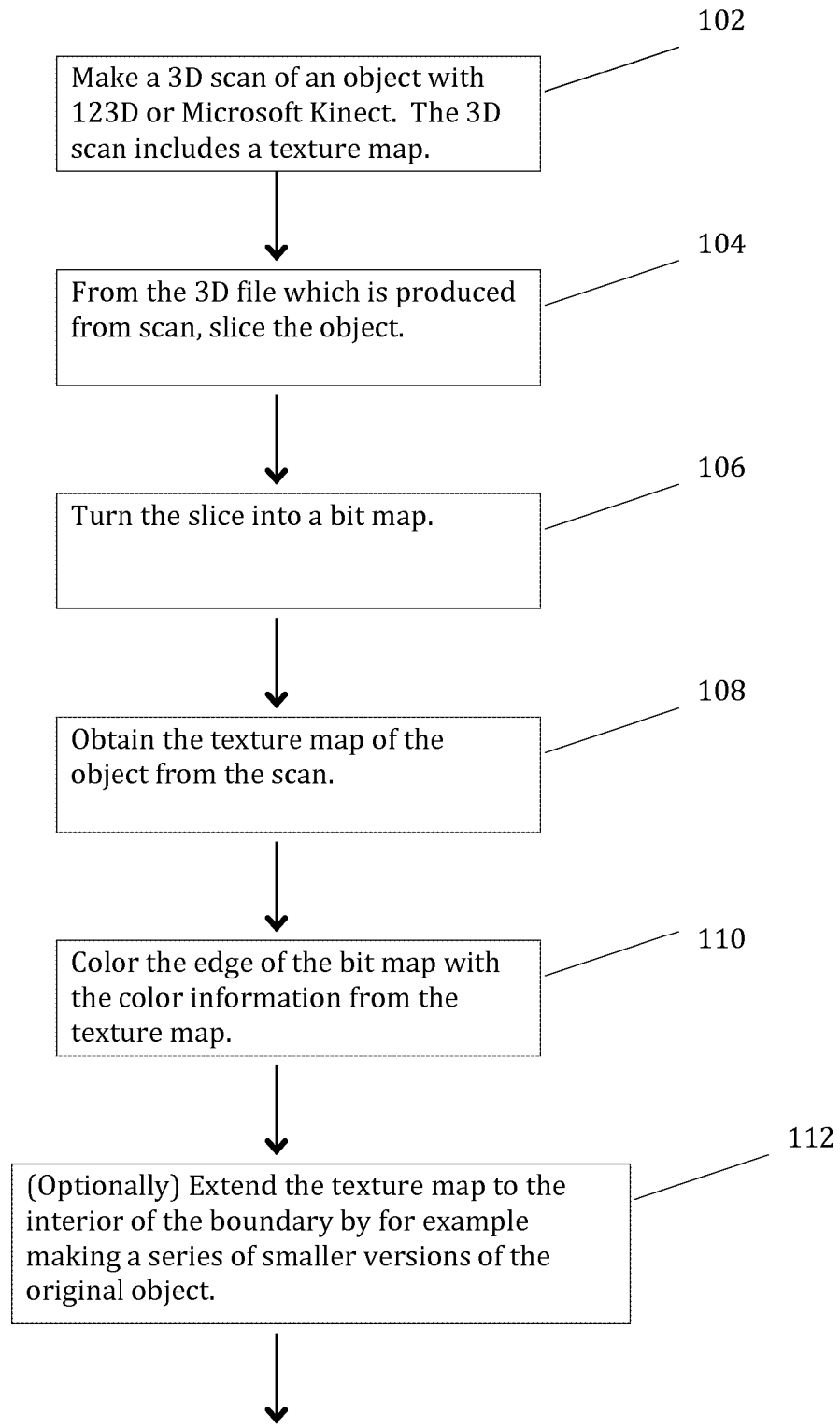
FIG. 1A is a flowchart illustrating a first part of the process of creating a photographic likeness.
Figure 1B:
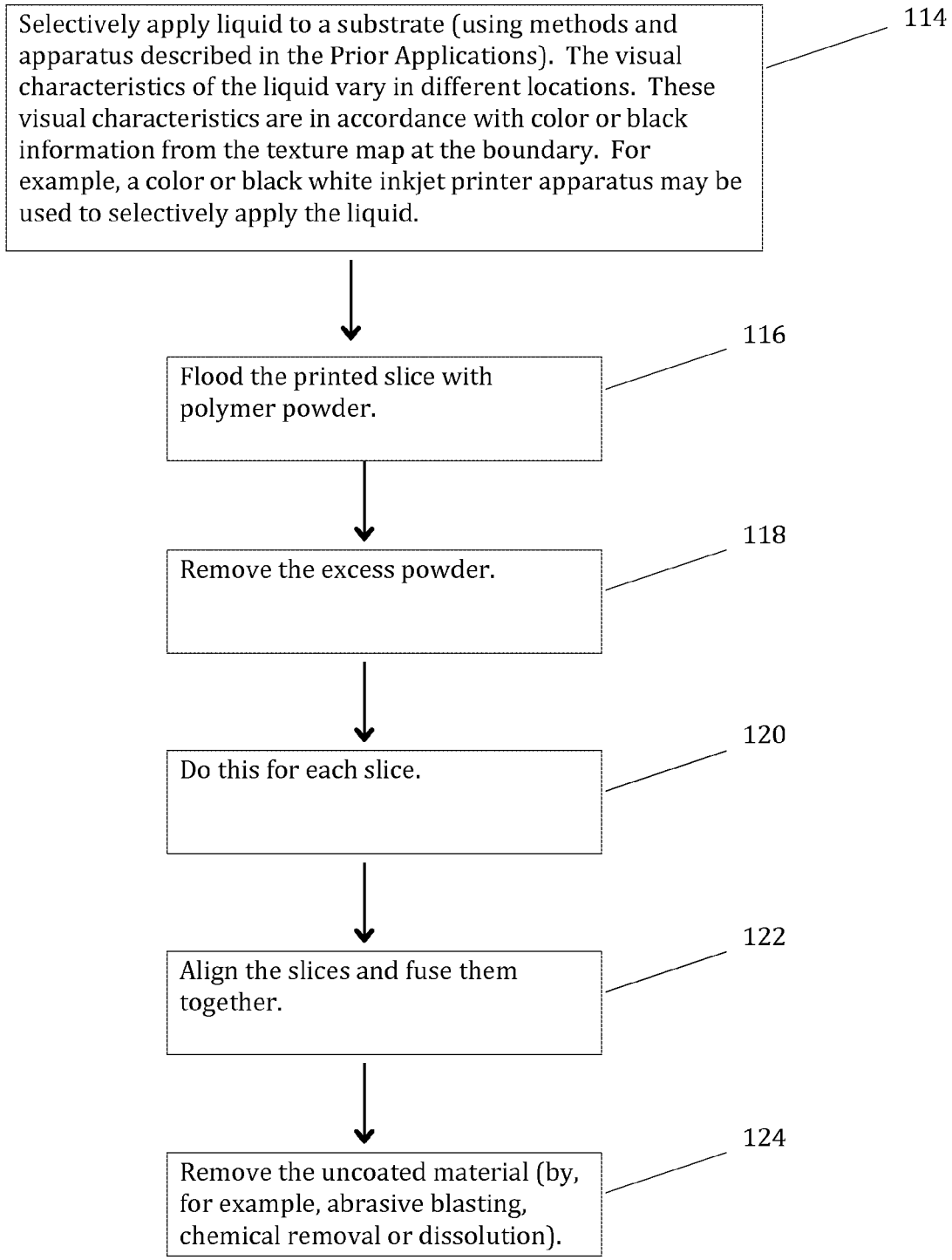
FIG. 1B is a flowchart illustrating the remaining part of the process of creating a photographic likeness.

FIGS. 1A and 1B describe the steps that may be used to create the "photographic" likeness. These are:

1. Make a 3D scan of an object with 123D or Microsoft Kinect. The 3D scan includes a texture map (Step 102).
2. From the 3D file which is produced from scan, slice the object (Step 104).
3. Turn the slice into a bit map (Step 106).
4. Obtain the texture map of the object from the scan (Step 108).
5. Color the edge of the bit map with the color information from the texture map (Step 110).
6. (Optionally) Extend the texture map to the interior of the boundary by for example making a series of smaller versions of the original object (Step 112).
7. Selectively apply liquid to a substrate (using methods and apparatus described in the Prior Applications). The visual characteristics of the liquid vary in different locations. These visual characteristics are in accordance with color or black information from the texture map at the boundary. For example, a color or black white inkjet printer apparatus may be used to selectively apply the liquid (Step 114).
8. Flood the printed slice with polymer powder (Step 116).
9. Remove the excess powder (Step 118).
10. Do this for each slice (Step 120).
11. Align the slices and fuse them together (Step 122).
12. Remove the uncoated material (by, for example, abrasive blasting, chemical removal or dissolution) (Step 124).

In illustrative implementations, a New Object can be fabricated with visual characteristics that are derived from photographic information about a Target Object.

The New Object can be colored by using liquid from color inkjet cartridges (the liquid may be selectively applied, using the methods and apparatus described in the Prior Applications). The problem with using the manufacturers ink, in this case HP, is that the ink is water soluble and can bleed, bleach, and run in the support removal process. This problem can be solved in a number of ways including using piezoelectric heads and pigment inks or using pigment based.

For example, different colors of ink may be selectively applied in positions that are defined by a CAD model. These positions may be at (and just below) what will become the surface of the New Object after excess (e.g., uncoated) support material is removed from the New Object.

Figure 2:
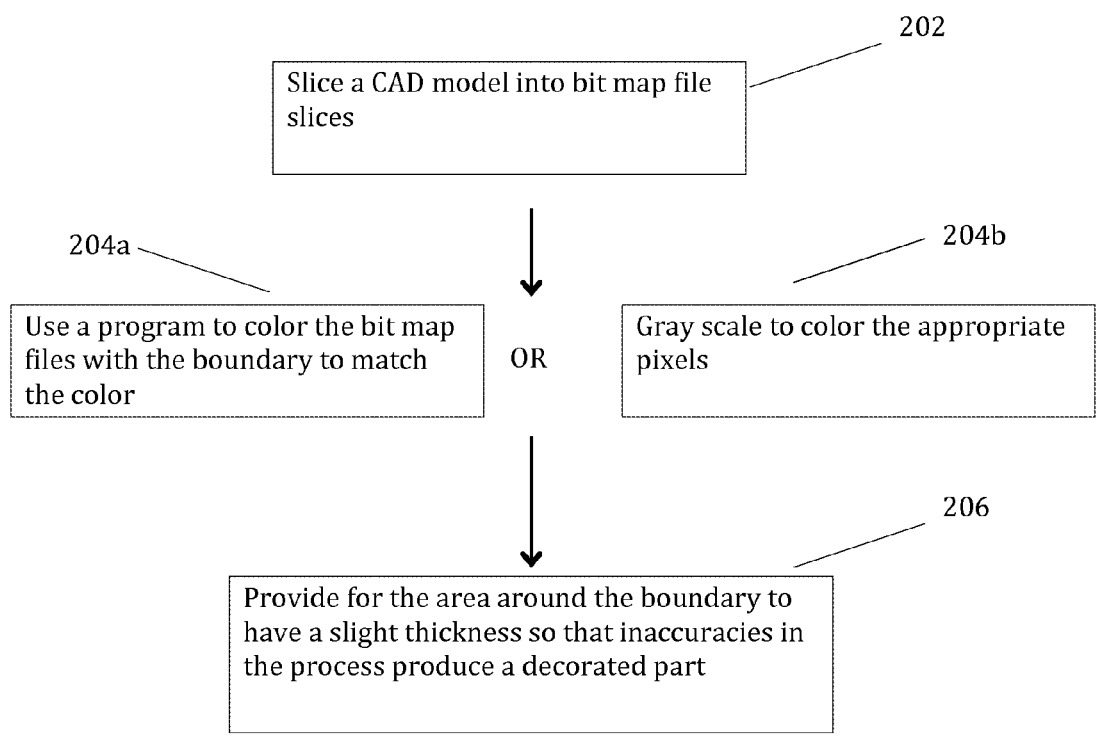
FIG. 2 is a flowchart illustrating the process of coloring bit map file slices.

FIG. 2 illustrates the process of coloring the bitmap in accordance with exemplary implementations of this invention. In step 202, a CAD model is sliced into slices (as described in the Prior Applications). These slices are bit maps files. In step 204a, the bit map file slices are colored by a program with the boundary to match the color, or, as in step 204b, gray scale to color the appropriate pixels. In step 206 (often advisable), the area around the boundary is provided to have a slight thickness so that any inaccuracies in the process still produce a decorated part.

Alternately, the colors may appear throughout the slice so that if the final object is cut open its interior composition can be seen. This would be useful in 3D models made from other 3D renderings including false color CT and MRI scans. This would allow for artificial dissections and other ways to display internal structure.

Figure 3:
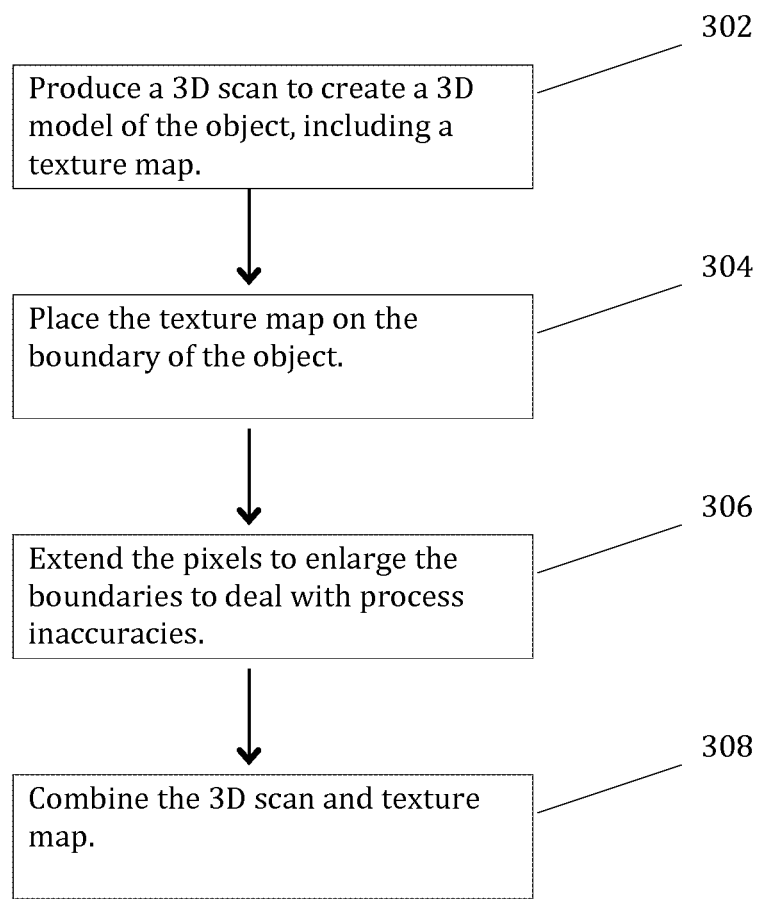
FIG. 3 is a flowchart illustrating the process of painting the photograph of a 3D object.

FIG. 3 illustrates the process of 'painting' the photograph of a 3D object on the 3D object. In step 302, one produces a 3D scan using systems like 123D which uses ordinary still photographs taken by an ordinary camera to create a 3D model of the object, including a texture map. Microsoft Kinect may be also be used which provides a 3D model and a color image which can also be used as a texture map. In step 304, the texture map is 'placed' on the boundary of the object. Next, step 306 is to again extend the pixels to enlarge the boundaries to deal with inaccuracies of the process.

Once the object is scanned, step 308 is performed in which the 3D scan and texture map can be combined. For example the Additive Manufacturing File Format can be used to construct slices which are color or black and white bit map files for each slice. Each file can include the texture map information and information which defines the slice. At least the boundary will have texture map information. If one wants to have internal color information, that will also be in the bit map. As noted above, generally the boundary will be made a little thicker to deal with the inaccuracies of the process. The bit map will be printed (using the methods and apparatus described in the Prior Applications) and the 3D New Object will be produced. The finished New Object will have a photographic likeness of the Target Object on the surface of the New Object.

In exemplary embodiments, this photographic likeness is an integral part of the layers of the New Object, and is not merely an exterior layer sprayed, painted or otherwise applied after the layers of the New Object have been fused. Other 3D file formats can be used.

Figure 4:
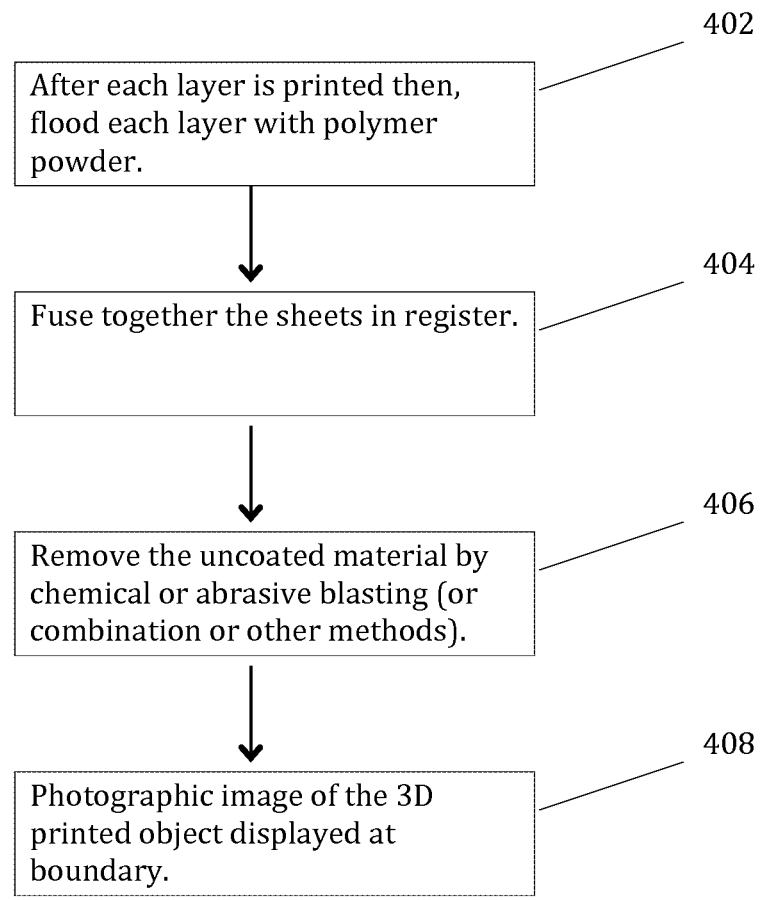
FIG. 4 is a flowchart illustrating the process of final processing.

One or more processors or computers may be configured to perform the computations involved in the above described steps, including those in FIGS. 1-4, as well as those shown in FIG. 1 of PCT patent application PCT/US12/52946, Methods and Apparatus for 3D Fabrication. FIG. 4 is described below.

In one aspect, this invention comprises a 3D article of manufacture produced by the methods and apparatus describe above. For example, this invention may comprise a 3D article of manufacture (a "New Object") comprising at least one composite material, which composite material comprises substrate layers coated by a thermoplastic or by a thermoset plastic. The layers of the New Object may include pigments or other visually colored or visually shaded material positioned at or adjacent to the surface of the 3D object. These pigments (or other visually colored or visually shaded material) may have, on at least a portion of its surface, a photographic likeness of another 3D physical object.

If one is creating a black and white photographic likeness, one can use two inks: a first dark ink for the black dots to decorate the object (and also used so that the powder sticks to the substrate) and a second clear ink for white or light areas (and also to output fluid so that the powder will stick to the substrate). The second ink can be used for any parts of the New Object which are white but nonetheless need to have material. This assumes that the substrate used in the process is white. If one wants to do color, one can use at least multiple cartridges for clear, process colors and possibly black or additional colors or no color for better color rendition.

One issue with this process relates to shadows and highlights or other artifacts in the original 3D image. Thus it is best if the object or objects are light with flat or diffuse lighting. In the instance where this is not possible, the scene can be relit to eliminate the effect of highlights and shadows among other features.

In exemplary implementations, this invention has many practical applications. Among other things, a 3D object can be produced to look like the original, for example sample of products, wedding or baby photographs, still lifes or natural landscapes. For example this would be a simple way of making a scale reproduction of the space shuttle or other object which by today's methods is costly, cumbersome and always lacking in correctness.

Additionally synthetic decorated objects can also be produced using fundamentally the same methods.

Further abrasive blasting can be used in addition to chemical methods to remove excess support material as described in the provisional patent application that is one of the Prior Applications.

The apparatus that produces these parts would comprise for example an x-y positioner which includes inkjet print cartridges. For example, for producing black and white photographic likenesses, at least two cartridges could be used: one for selectively depositing clear liquid (to determine where powder will adhere to the substrate in a white part of the object) and the other for selectively depositing black ink Or, for example, for producing color photographic likenesses, four cartridges could be used, for example the three process colors and clear (again, the clear liquid can be used to determine where powder adheres to the substrate in a white or light part of the object). These would print in accordance with a bit map which is a slice of the object being printed. The boundary of the object would have the color or black printed on it, or clear for white. This boundary could be larger than one pixel.

FIG. 4 illustrates final processing. In step 402, after each layer is printed then the layer would be flooded with polymer powder as described in documents incorporated in this application by reference. In step 404, the sheets would be fused together in register. In step 406, the uncoated material would be removed by chemical or abrasive blasting or combination of the two or other methods. In step 408, the boundary would now display the photographic image on the 3D printed object.

Figure 5:
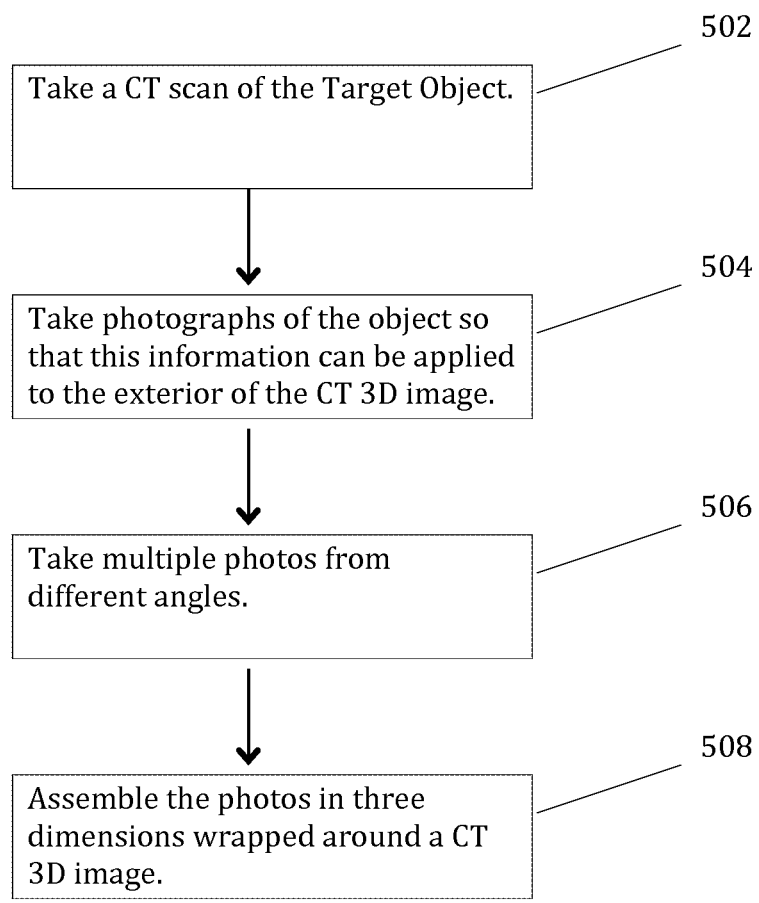
FIG. 5 is a flowchart illustrating an alternative 3D fabrication process.

FIG. 5 illustrates an alternate 3D fabrication process. In this embodiment, the object could be based on a CT scan with colors throughout and those colors could be printed throughout the object. In step 502, a CT scanner can be used to take a CT scan of the Target Object. In step 504, an ordinary camera may be used to take photographs of the object so that this information can be applied to the exterior of the CT 3D image. In step 506, multiple photos may be taken from different angles. In step 508, these photos are then assembled in three dimensions and wrapped around a CT 3D image.

The object could for example comprise of layers of polyester woven or non-woven material which has a photographic image on the boundary or other image throughout the object which is fused together with a polymer or other material. This may include residue of 2-Pyrrolidone or other material which was used to slow the evaporation of inks or fluids. This would be for example an object that has a photograph texture map printed on it. Again the color or black and white could be printed on the object either at the surface or throughout the object.

While the invention has been described with particular reference to specific embodiments, it will be apparent to those skilled in the art that the same principles may be used in similar arrangements. The invention is not limited to the precise structures described. Various changes and modifications may be made without departing from the spirit and scope of the invention as defined by the claims below. For example, steps of a process can be in any order, unless the context clearly indicates otherwise.

Selected Matter of Disclosures Incorporated by Reference

The following are passages from the disclosures incorporated herein by reference. These passages describe methods and apparatus for how the New Object may be fabricated. The first, Methods and Apparatus for 3D fabrication, describes how a 3D object is formed layer by layer, where thermoplastic powder (or thermosettable plastic powder) is selectively deposited on one layer of substrate, then on a second layer of substrate, then on a third, and so no. The second, Methods and Apparatus for 3D Printed Composite Materials, describes methods and apparatus for fabricating a 3D object. The object is made, at least in part, of a layered composite material, the composite material may comprise carbon fiber substrate layers joined by a hardened thermoplastic or thermoset.

(1) Methods and Apparatus for 3D Fabrication, PCT Patent Application PCT/US12/52946, International Filing Date Aug. 29, 2012

Selective Deposition of Powder:

According to principles of this invention, the powder may be selectively deposited on substrate layers in many different ways.

Example 1

Of Selective Deposit of Powder

First, powder may be selectively deposited on a substrate layer by making the powder adhere to a liquid, as follows: A liquid is selectively deposited on a substrate layer, so that some parts of the substrate layer are covered with liquid, and some are not. Then the side of the substrate layer on which the fluid was deposited is flooded with powder (e.g., the powder is poured on this side of the substrate layer). The powder adheres to the liquid. The excess powder (i.e., the powder that is not adhering to the liquid) is removed. For example, this excess powder may be removed by vacuuming. Or, for example, the substrate may simply be flipped over, so that the excess powder falls off. Or the substrate may be turned upside down and flicked with a finger. The substrate may be vibrated while the excess powder is removed, in order to facilitate the removal. In some cases, the liquid that is selectively deposited is water (or an aqueous solution that includes a material that slows the evaporation of water). For example, the material may be 2-Pyrrolidone. In other cases, it is a different liquid, such as an alcohol. For example, if the substrate is water sensitive (e.g. if the substrate is polyvinyl alcohol, PVOH), then water may distort or dissolve the substrate. In that case, an alcohol may be used as the liquid that is selectively deposited. In some cases, to prevent the liquid that is selectively deposited from spreading or being excessively absorbed into the substrate, it is helpful to apply a surface energy modifier to the substrate, before selectively depositing the liquid. For example, Scotchguard® Fabric & Upholstery Protector (available from 3M, St. Paul, Minn.) may be sprayed or deposited on the substrate layer for this purpose. Alternately, other repellents or surface energy modifiers can be used.

(2) Methods and Apparatus for 3D Printed Composite Materials, U.S. Provisional Patent Application 61/769,724, Filed Feb. 26, 2013.

In an illustrative implementation of this invention, a composite 3D object is produced as follows:

1. Cut nonwoven carbon fiber substrate layer on laser cutter. Cut registration holes into the layer. The substrate can be cut in advance of the rest of the process.
2. Put nonwoven substrate layer on registration post of printer.
3. "Print" a slice. (In this step, liquid is selectively applied to the carbon fiber substrate layer, e.g., by inkjet printing).
4. Remove carbon fiber substrate layer from printer.
5. Flood carbon fiber substrate layer with thermoplastic powder. The powder adheres or "sticks" to the substrate only where the liquid was applied.
6. Remove excess powder by turning carbon fiber substrate layer over and shaking until excess powder it falls off.
7. Remove any remaining excess powder with a stream of compressed air.
8. Place carbon fiber substrate on a heated surface (e.g., a hot griddle or other heating element) and melt the powder that adhered to the printing liquid. Preferably, the heated surface has been previously treated with polytetrafluoroethylene, so that the carbon fiber substrate does not stick to the heated surface. Alternately, a layer of another material may be interposed between the heated surface and the carbon fiber substrate, to prevent sticking
9. Place the printed carbon fiber substrate on a fixture using registration holes to align.
10. Return to step 2 until all layers have been printed and placed on the fixture, creating a stack of printed carbon fiber/polymer powder layers
11. Place the stack into a compression device. Then use the compression device to apply pressure to the stack. The compression device may include, for example (1) springs for applying compression; and (2) bolts or stand-offs for limiting the amount that the substrate layers are compressed.
12. Preheat oven.
13. Put compression device (with stack of carbon fiber layers in it) in oven.
14. Heat the compression device (with the carbon fiber layers in it) for appropriate time.
15. Remove compression device from oven.
16. Let compression device cool to room temperature.
17. Open up the compression device (e.g., in some cases, by unscrewing nuts).
18. Remove fused 3D object from the compression device.
19. Remove the excess region of each substrate layer by abrasive blasting. The excess region is the portion of the substrate layer that was not covered or permeated by the melted thermoplastic material.

What is claimed is:

1. A method of fabricating a new color 3D object, which new color 3D object comprises a plurality of substrate layers that are infiltrated by and bound together by a hardened material, the method comprising the following steps, in combination:
   (1a) positioning powder on all or part of at least one of the layers;
   (1b) repeating step (1a) for remaining layers in the plurality of substrate layers;
   (1c) transforming at least some of the powder into a substance that flows and subsequently hardens into the hardened material, which hardened material is disposed in a spatial pattern that infiltrates at least one positive region in a set of the substrate layers and does not infiltrate at least one negative region in the set;
   wherein the powder is transformed in step (1c) after being positioned in either step (1a) or step (1b), and wherein the substrate layers have a least one material property that is different than any material property of the hardened material;
   further comprising steps to create the photographic likeness of a target object such that the 3D object is a photosculpture of the target object, including prior to step (1a):
   (1d) making a scan of an object, the scan including a texture map;
   (1e) slicing the object from the 3D file which is produced from the scan;
   (1f) turning the slice into a bit map;
   (1g) obtaining a texture map of the object from the scan;
   (1h) coloring the edge of the bit map with the color information from the texture map;
   and further including the steps of:
   selectively applying liquid to a substrate;
   flooding the printed slice with polymer powder;
   removing the excess powder;
   repeating the steps for each slice;
   aligning the slices and fusing them together;
   removing the uncoated material.

2. The method of claim 1, wherein the removal of uncoated material is done by abrasive blasting, chemical removal or dissolution.

3. The method of claim 1, wherein the colors appear throughout the slice so that if the final object is cut open its interior composition can be seen.

4. The method of claim 1, wherein one or more processors or computers are configured to perform the computations involved in doing the steps.

5. The method of claim 1, wherein the step of coloring the edge of the bitmap involves the steps of
   (5a) slicing a CAD model into bit map file slices;

(5b) using a program to color the bit map files with the boundary to match the color, or gray scale to color the appropriate pixels; and (5c) providing for the area around the boundary to have a slight thickness so that inaccuracies in the process produce a decorated part.

6. The method of claim 1, wherein painting the photograph of the new 3D object involves the steps of (6a) producing a 3D scan to create a 3D model of the object, including a texture map;

(6b) placing the texture map on the boundary of the object; and (6c) extending the pixels to enlarge the boundaries to deal with process inaccuracies.

7. The method of claim 1, wherein final processing of the fabrication involves the steps of (7a) flooding each layer with polymer powder after each layer is printed;

(7b) fusing together the sheets in register;

(7c) removing the uncoated material by chemical or abrasive blasting or combination of other methods; and (7d) displaying the photographic image of the target object at boundary.

8. The method of claim 1, where step 1(d) involves the steps of (8a) taking a CT scan of the target object;

(8b) taking photographs of the target object so that this information is can be applied to the exterior of the CT 3D image;

(8c) taking multiple photos from different angles; and (8d) assembling the photos in three dimensions wrapped around a CT 3D image.

9. The method of claim 1, wherein the new object is colored by using liquid from color inkjet cartridges.

10. The method of claim 1, wherein an Additive Manufacturing File Format is used to construct slices which are color or black and white bit map files for each slice.

11. The method of claim 1, wherein the layers of the new object include pigments or other visually colored or visually shaded material positioned at or adjacent to the surface of the 3D object.

12. The method of claim 1, comprising using two inks: a first dark ink for the black dots to decorate the object and a second clear ink for white or light areas, such that the second ink is used for any parts of the new object which are white but nonetheless need to have material.

13. The method of claim 1, comprising using multiple cartridges for clear, process colors and black.

14. The method of claim 1, wherein the new object comprises layers of polyester woven or non-woven material, whereby a photographic image on the boundary or other image throughout the object appears, and the object is fused together with a polymer or other material.

15. The method of claim 14, wherein the layers of polyester woven or non-woven material includes residue of 2-Pyrrolidone.

16. The method of claim 1, wherein the new object comprises a plurality of layers that are infiltrated by and bound together by a hardened material, wherein the hardened material comprises either a thermoplastic or thermosettable plastic and exhibits a set of one or more characteristics, which set is sufficient for distinguishing the hardened material as having formed as a result of powder positioned on the layers, respectively, at least partially softening and then hardening.

* * * * *